United States Patent Office 2,824,303
Patented Feb. 18, 1958

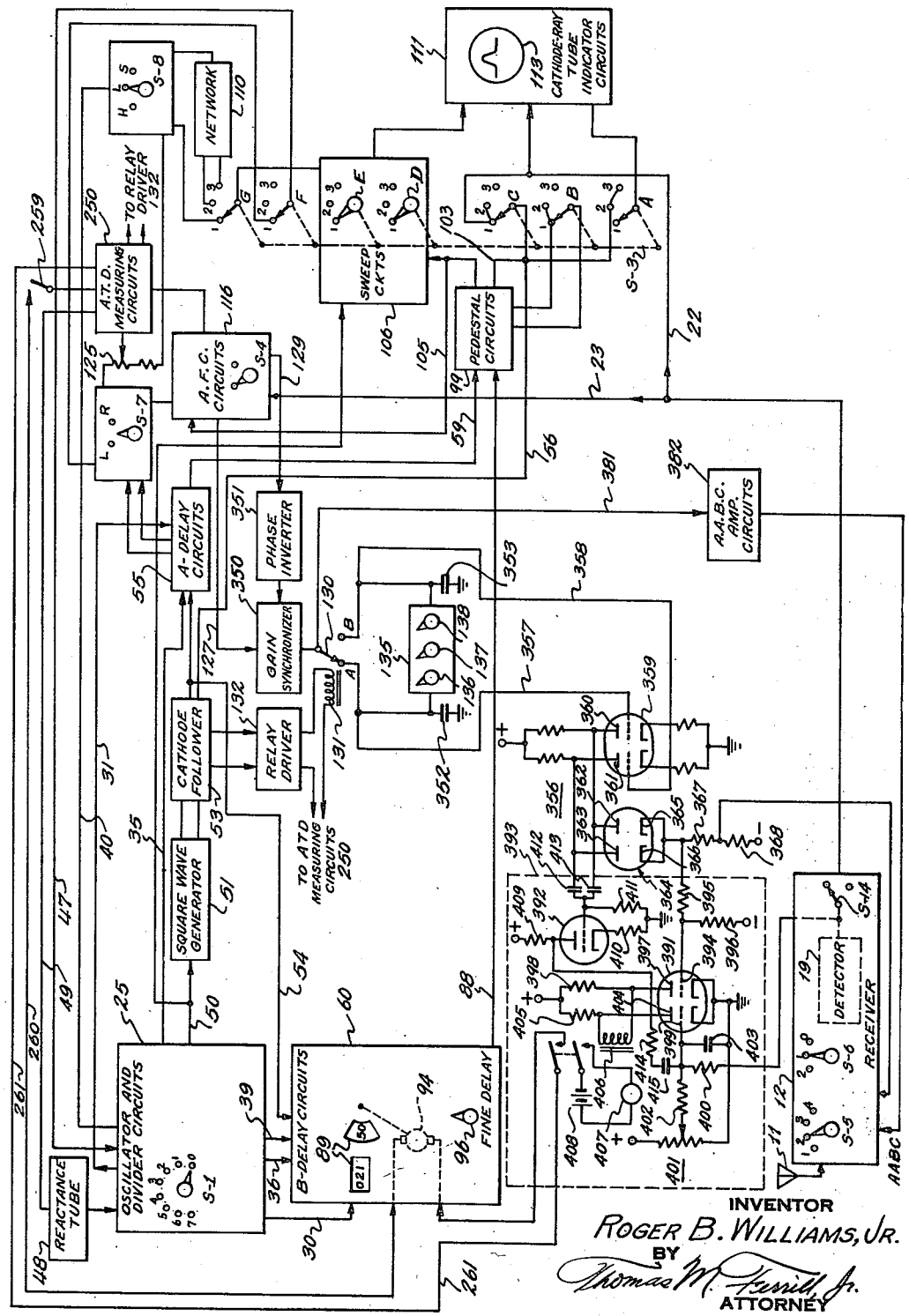

2,824,303

AUTOMATIC SYNCHRONIZATION INDICATOR AND CONTROL CIRCUITS FOR HYPERBOLIC NAVIGATION RECEIVERS

Roger B. Williams, Jr., Glen Head, N. Y., assignor to Sperry Rand Corporation, a corporation of Delaware Application February 1, 1954, Serial No. 407,353

14 Claims. (Cl. 343—103)

The present invention relates to improvements in hyperbolic navigation receivers, and in particular to an automatic synchronization indicator and control circuit useful in such receivers to indicate satisfactory operation.

One well known type of hyperbolic navigation system is the loran system which employs pairs of spaced ground stations transmitting radio pulse signals in all directions. One ground station, known as the master, transmits periodic A pulses of accurately established recurrence intervals. The second ground station, known as the slave, transmits periodic B pulses of the same recurrence interval as the A pulses but delayed in time therefrom. The loran receiver-indicator accurately measures the difference in time between the arrival of the A pulses from the master station and the arrival of the B pulses from the slave station.

Patent 2,651,033 shows and describes one type of loran receiver-indicator for measuring the difference in time between the arrival of the A and B pulses. The receiver-indicator employs precision timing circuits including a highly stable reference oscillator and a cascade of frequency dividers. The precision timing circuits produce first recurrent pulses which are positioned in time in order to be brought into coincidence with the received A pulses. Thereafter the first recurrent pulses are maintained in synchronism with the received A pulses by an AFC system which controls the frequency of the stable reference oscillator. The precision timing circuits further include time delay circuits for producing second recurrent pulses whose time delay relative to the first recurrent pulses is accurately measured and indicated on a time delay counter or indicator. The time delay of the second recurrent pulses relative to the first recurrent pulses is manually adjusted until they are brought into coincidence with the received B pulses. The time difference between the arrival of the A and B pulses is the time difference indicated on the time delay indicator. Complete adjustment procedure of the loran receiver-indicator of Patent 2,651,033 is described therein under the section entitled "Operation of Improved Loran Receiver-Indicator."

When the loran receiver-indicator is used on a moving craft such as a ship, the time difference between the arrival of the loran A and B pulses may vary as the ship's position is varied relative to the fixed loran transmitting stations. This change in the time difference between the arrival of the loran A and B pulses necessitates the continual readjustment of the loran receiver-indicator by an operator to measure the changing time difference intervals.

In my copending application S. N. 267,347, now Patent 2,697,219, filed January 21, 1952, entitled "Automatic Time Difference Measuring Circuits," and assigned to the same assignee as the present invention, I have shown and described an automatic tracking loran receiver-indicator which will automatically measure the time difference interval between received A and B pulses as the receiver-indicator moves relative to the transmitting stations. This automatic measurement of the time difference interval relieves the operator of the necessity of continually adjusting the loran receiver-indicator to obtain navigational information. In this automatic tracking loran receiver-indicator, an auxiliary time difference indicator or counter may be located remote from the location of the loran receiver-indicator for the convenience of the operator or navigator. For example, the time difference indicator or counter may be located at the navigator's map table containing the loran charts.

The time difference indicator of the loran receiver of Patent 2,651,033, or of the receiver of my aforesaid application S. N. 267,347, now Patent 2,697,219, will not indicate the correct time difference interval upon the loss of reception of either the loran A or B pulses, or if either the loran A or B pulses are "blinking." Moreover, if the highly stable oscillator of the precision timing circuits is not properly synchronized with the received loran A pulses, or if the delayed recurrent pulses from the precision timing circuits are not properly synchronized with the received B pulses, the time difference indicator or counter will not indicate the correct time difference interval. Incorrect indications on the loran time difference indicator presents a serious problem especially where the indicator is remotely located from the loran receiver-indicator. Furthermore, in the automatic tracking loran receiver-indicator, the tracking circuits may drift aimlessly in search of the lost or unsynchronized loran signal pulses unless some means is devised to disable the automatic tracking circuits. The present invention is directed to a system for indicating the existence of the above-mentioned improper operating conditions, and the system includes a warning device for informing the operator that the indicated time difference measurement is not to be relied upon.

Accordingly, a principal object of the present invention is to provide an indication of the existence of proper synchronization of a loran receiver-indicator with the received loran signals.

Another object is to automatically provide a warning indication upon the loss of synchronization of the loran receiver-indicator with either or both the received loran master or slave signals.

Still another object of the present invention is to disable the automatic time difference measuring system of a loran receiver-indicator upon the loss of synchronization between the loran receiver-indicator and either or both the received loran master and slave signals.

Yet another object is to provide a warning indication of the condition when either or both the received loran master or slave signals are blinking and unsuitable for navigational purposes.

A further object is to provide at a location remote from the loran receiver-indicator a warning signal for informing an operator of the condition when the navigational information supplied by the receiver-indicator is in error and should not be relied upon.

In accordance with the present invention, there is introduced a system for indicating the existence of proper synchronization of the precision timing circuits of a loran receiver-indicator with the received loran master and slave pulse signals. The invention includes a pulse coincidence circuit having a first input coupled to the precision timing circuits of the loran receiver-indicator and having a second input coupled to the output of the receiver. The precision timing circuits provide first recurrent output pulses which are adapted to be synchronized with the received loran master pulses by an automatic synchronization or frequency control system external to the pulse coincidence circuit. These first recurrent output pulses are supplied to the pulse coincidence circuit as are the received loran master pulses. Upon the proper synchronization of the first recurrent pulses with the received master pulses by the automatic synchronization system, the first recurrent pulses occur in coincidence with the received master pulses and the pulse coincidence circuit produces a first output control voltage. In the absence of received master pulses, or where the precision timing circuits are not properly synchronized with the received master pulses, the pulse coincidence circuit does not produce a first output control voltage.

The precision timing circuits provides second recurrent output pulses of the same recurrence time interval as the first output pulses but delayed therefrom by adjustable amounts under the control of precision time delay circuits. These delayed second output pulses are adapted to be positioned in time to coincide with the received slave pulses by means of a manually adjustable time delay control, and are further adapted to be synchronized with the received slave pulses by the automatic time difference measuring circuits of my aforesaid pending application S. N. 267,347, now Patent 2,697,219. Upon the proper adjustment and synchronization of the second recurrent output pulses with the received slave pulses, the second recurrent pulses occur in coincidence with the received slave pulses and the pulse coincidence circuit produces a second output control voltage.

A selector circuit is coupled to the output of the pulse coincidence circuit and is responsive to the smaller or weaker of the first and second output control voltages. The selector circuit supplies an output control voltage for biasing the grid of an electron tube relay circuit. In the absence of either received loran master or slave pulses, the selector circuit produces susbtantially zero output bias control voltage. In one embodiment of the invention, the electron tube relay circuit responds to said zero output bias by deenergizing a warning indicator lamp coupled to the relay circuit to indicate unsatifactory operation of the loran receiver-indicator. The same warning indication is presented when either the first or the second recurrent output pulses from the precision timing circuits are not synchronized with the received loran master and slave pulses. The adjustable precision time delay circuits of the loran receiver-indicator are intercoupled with the relay circuit to disable or prevent the delay circuits from varying the time delay of the second recurrent output pulses when the warning lamp indicates unsatisfactory operation of the receiver indicator. For the condition where either of the received loran master or slave pulses are "blinking," which signifies improper operation of the loran transmitting stations, the output control voltage from the selector circuit slowly varies in magnitude causing the warning indicator lamp in the relay circuit to blink in response thereto.

The above objects of and the brief introduction to the present invention will be more fully understood, and further objects and advantages will become apparent from a careful study of the following detailed description in connection with the drawing, wherein, The single figure illustrates a combination block and schematic diagram of a loran receiver-indicator employing the automatic synchronization indicator and control circuit of the present invention.

Those elements in the accompanying drawing fully corresponding to those in the aforesaid Patent 2,651,033 and in my application S. N. 267,347, now Patent 2,697,219, are identified by the same reference numerals as employed therein.

Referring to the single figure, loran A and B pulses of carrier-wave energy from remote master and slave stations are collected by antenna 11 and supplied to the input of superheterodyne receiver 12. Receiver 12 is identical to the receiver shown and described in the aforesaid Patent 2,651,033. The received A and B pulses are amplified, detected, and supplied as positive A and B pulses over lead 22 to the cathode-ray tube indicator circuits 111, and over lead 23 to an input of the AFC circuits 116. A automatic gain control voltage from the AGC circuits 356 is supplied to receiver 12 as will be explained more fully hereinafter. An amplitude balance control voltage from the AABC amplifier circuit 382 also is supplied to receiver 12 as will be explained hereinafter.

The precision timing circuits of the loran receiver-indicator comprise the oscillator and divider circuits 25, the square-wave generator 51, the A delay circuits 55, and the B delay circuits 60. These circuits are similar to those described and claimed in application S. N. 633,473, filled December 7, 1945, in the name of Winslow Palmer, now Patent No. 2,731,634, issued January 17, 1956, entitled "Timing Apparatus" and assigned to the same assignee of the present invention. They are identical with those shown and described in the aforesaid Patent 2,651,033, and, therefore, will be described only briefly in the present specification.

Oscillator and divider circuits

The conventional oscillator and divider circuits of block 25 comprise a crystal-controlled oscillator operating at a frequency of 100 kilocycles-per-second, and a cascade of five frequency dividers, dividing the frequency of the oscillator output voltage in the steps of 5, 4, 5, 5, and 4 respectively, followed by a transient delay circuit. These frequency divider circuits supply the basic timing voltages for the loran receiver-indicator. The output voltage from the first frequency divider is supplied over lead 30 to one input of the B delay circuits 60, and over lead 31 to one of the inputs of the A delay circuits 55. The output voltage of the third frequency divider is supplied over lead 35 to another input of the A delay circuits 55, and over the lead 36 to a second input of the B delay circuits. The output voltage from the fourth frequency divider is supplied over lead 39 to a third input of the B delay circuits. The output voltage from the transient delay circuit is coupled over lead 50 to the input of the square-wave generator 51, and over lead 52 to the sweep circuit 106.

The basic pulse repetition rates used in loran are 33⅓, 25, and 20 cycles per second, and are identified by the letters H, L, and S. These pulse repetition rates are provided in the oscillator-divider circuits 25 by the basic PRR switch S-8 coupled over lead 40 to the fifth frequency divider of the oscillator-divider circuits. This switch S-8 controls the frequency division of the fifth frequency divider to provide a division of 3 for the rate H, 4 for the rate L, and 5 for the rate S. In addition to the three basic pulse repetition rates H, L, and S, seven additional specific pulse repetition rates identified as 0 through 7 are employed in loran. The specific PRR switch S-1 controls the feedback of pulses from the output of the fifth frequency divider to the inputs of the second and third frequency dividers to provide these specific rates in the oscillator-divider circuits 25.

A reactance tube circuit 48 is coupled to the 100 kilocycle-per-second crystal oscillator, and corrects the frequency of this oscillator in response to an automatic frequency control voltage supplied over lead 49 from the AFC circuits 116 and the ATD measuring circuits 250. A description of these AFC circuits will appear hereinafter.

Square-wave circuits

The positive output pulse voltage on lead 50 from the oscillator and divider circuits is differentiated at the two inputs of an Eccles-Jordan circuit used as a square-wave generator 51 to produce a square-wave output voltage whose frequency is equal to one-half the repetition frequency of the differentiated triggering pulses. The frequency of this square-wave voltage corresponds to the pulse repetition frequency of the loran signals. The mark and space time intervals of the square-wave voltage are each equal to 20,000 microseconds for the selected loran pulse repetition rate LO. The square-wave output voltage from generator 51 is supplied to a push-pull cathode follower 53.

Cathode follower 53 produces two square-wave output voltages, one inverted in phase with respect to the other, and one of these square-wave voltages is supplied over lead 54 to the input of the A delay circuits 55 and to the B delay circuits 60. The other square-wave voltage is supplied over lead 56 to the arm of operations switch S–3C. Both of the square-wave voltages are supplied to the relay driver 132. The negative half-cycle of the square-wave voltage on lead 54 energizes the A delay circuits 55, and this voltage is subsequently synchronized with respect to the received loran signals so as to correspond with the time interval during which the A pulses from the master station arrive at the receiver 12. The positive half-cycle of the square-wave voltage on lead 54 energizes the B delay circuits 60, and corresponds to the time interval during which the B pulses from the slave station will arrive at the receiver.

A delay circuits

The A delay circuits 55 comprise a pedestal delay circuit and a pedestal synchronizer, as is more fully described in the aforesaid Patent 2,651,033. The square-wave voltage on lead 54 is differentiated to produce negative trigger pulses coincident with the trailing or "negative going" edges of the square-wave voltage, and these negative trigger pulses initiate the pedestal delay circuit. The voltage on lead 35 from the third frequency divider is also differentiated and applied to the pedestal delay circuit to terminate the pedestal delay circuit by the first of the trigger pulses to arrive following the initiation of the pedestal delay circuit. The output from the pedestal delay circuit is a series of positive pulses of one-thousand microseconds duration and whose recurrence interval equals the recurrence interval of the square-wave voltage on lead 54.

Both positive and negative output pulses from the pedestal delay circuit are applied to the "left-right" switch S–7. The positive pulses are coupled through the "left" position of switch S–7 and through position 1 of switch S–3F to the input of the third frequency divider over the lead 47 to delay the triggering of the third frequency divider by one more of its 200 microsecond input pulses. This causes an increase in the recurrence interval of the output pulses from the fifth divider which results in an increase in the recurrence interval of the sweep voltage applied to the cathode-ray tube indicator circuits 111. This increase in sweep recurrence interval causes the received loran pulses to drift slowly across the face of the cathode-ray tube toward the left. Conversely, the negative pulses from the pedestal delay circuit are coupled to the "right" position of switch S–7 and through position 1 of switch S–3F and over lead 47 to the input of the third frequency divider in order to pretrigger this divider by one less of its 200 microsecond input pulses. This reduction in recurrence interval results in a shorter sweep recurrence interval thereby causing the loran pulses delineated upon the face of the cathode-ray tube to drift slowly across the face of the tube toward the right. When the "left-right" switch S–7 is in its neutral position, there is no feedback of pulses and consequently there is very little if any drift of the delineated loran pulses.

The pedestal synchronizer is triggered by negative pulses derived from and coincident with the trailing edges of the positive output pulses from the pedestal delay circuit. The pedestal synchronizer is terminated by the first of the fifty microsecond negative trigger pulses on lead 31 to arrive following the initiation of the pedestal synchronizer. The output from the pedestal synchronizer is a series of positive pulses of approximately fifty microsecond duration and whose recurrence interval equals the recurrence interval of the square-wave voltage on lead 54. The trailing edges of these output pulses are delayed approximately one thousand and fifty microseconds from the trailing edges of the square-wave voltage on lead 54, and the timing of the trailing edges of these output pulses is under the accurate control of the pulses on lead 31 from the first frequency divider. These recurrent output pulses are coupled over lead 59 to the input of pedestal circuits 99.

B delay circuits

The B delay circuits 60 are similar to those shown and described in the aforesaid application S. N. 633,473, now Patent No. 2,731,634, and are identical to those shown and described in the aforesaid Patent 2,651,033. The function of the B delay circuits is to produce recurrent variably delayed output pulses whose recurrence interval is equal to the recurrence interval of the square-wave voltage on lead 54, and whose time delay with respect to the recurrent output pulses from the A delay circuits 55 is adjustable by accurately known amounts indicated on a time difference counter 89. This time delay difference is established with an absolute accuracy better than 1 microsecond. The recurrent variably delayed output pulses from B delay circuits 60 occur during the time interval that the half-cycle of the square-wave voltage on lead 54 is positive. The recurrent output pulses from the A delay circuits occur during the time interval that the half-cycle of the square-wave voltage on lead 54 is negative. Therefore, a fixed time delay exactly equal to one-half the recurrence interval of the square-wave voltage on lead 54 exists between the recurrent pulses from the B delay circuits 60 and the recurrent pulses from the A delay circuits 55 in addition to the variable time delay introduced by the B delay circuits.

The recurrent variably delayed output pulses on lead 88 from the B delay circuits 60 are approximately 30 microseconds in duration, and are variable in time relative to the leading edges of the square-wave voltage on lead 54 smoothly and unambiguously over the range of from 1,050 to almost 20,000 microseconds. Moreover, the trailing edges of these variably delayed pulses vary in time relative to the trailing edges of the output pulses from the A delay circuits 55 on lead 59 smoothly and continuously over the range of exactly 0 to almost 20,000 microseconds plus exactly one-half the recurrence time interval of the received loran A and B pulses under the control of servo motor 94 and the fine delay control knob 96.

Pedestal circuits

The pedestal circuits 99 comprise a pulse mixer and a pedestal generator. Negative trigger pulses derived by differentiating the trailing edges of the positive recurrent output pulses on lead 59 are combined with negative trigger pulses derived by differentiating the trailing edges of the positive recurrent output pulses on lead 88 in the pulse mixer. Each of these negative trigger pulses initiate the pedestal generator, a monostable multivibrator, which is terminated automatically by its own action. The pedestal generator provides a separate positive and a negative pulse output voltage. These pedestal pulses are of approximately 1,300 microseconds duration for positions 1 and 2 of operation switch S–3B, and are approximately 175 microseconds duration for position 3 of S–3B. The positive pedestal output pulses are supplied over lead 103 to the arm of operations switch S–3C, and also to terminals 2 and 3 of switch S–3A. The pedestal pulses initiated by the pulse voltage on lead 59 produce the A pedestal, and the variably delayed pedestal pulses initiated by the pulse voltage on lead 88 produce the B pedestal. The square-wave voltage from the cathode follower 53 appearing on lead 56 is combined with the positive pedestal pulses on lead 103. The negative pedestal pulses are supplied over lead 105 to terminals 2 and 3 of operations switch S–3E, and also to one input of the AFC circuits 116.

Sweep circuits

The sweep circuits 106 include a gate generator, a sweep generator for producing a slow, medium, or fast sweep-speed voltage, and a sweep restorer. Trigger pulses produced from the trailing edges of the recurrent output voltage from the oscillator-divider circuits 25 on lead 52 initiate the sweep generator to produce the slow sweep-speed voltage. When the switch S-3E is in position 1, this slow sweep-speed voltage is supplied to one input of the cathode-ray tube indicator circuits 111. The medium and fast sweep-speed voltages are produced when the operations switch S-3E is in the positions 2 and 3, respectively, and these sweep voltages are initiated by the recurrent negative pedestal pulses supplied over lead 105. The sweep generator produces a linear, medium sweep-speed voltage coincident with and for the duration of the recurrent negative pedestal pulses when switch S-3E is set to position 2. Similarly, the fast sweep-speed voltage is coincident with and extends for the duration of the recurrent negative pedestal pulses when the operations switch S-3 is set to position 3.

Network 110 coupling basic PRR switch S-8 with switch S-3G serves to maintain the amplitudes of the three sweep-speed voltages of constant value for the three basic pulse repetition rates H, L, or S. The sweep restorer included within the sweep circuits 106 clamps the lower edges of the three sweep-speed voltages to a reference voltage level to insure that the cathode-ray trace on the face of the cathode-ray tube starts from the same point on the face for each of the three sweep voltages.

Cathode-ray tube indicator circuits

The cathode-ray tube indicator circuits 111 include a cathode-ray tube, a horizontal sweep amplifier, a vertical amplifier, and an intensity restorer. The sweep voltages from the sweep circuits 106 are amplified in the horizontal sweep amplifier and applied to the horizontal deflection plates of the cathode-ray tube 113. The vertical amplifier amplifies the composite voltage consisting of the pedestal pulses on lead 103, the square-wave voltage on lead 56, and the received loran A and B pulses on lead 22, and supplies these voltages to the vertical deflection plates of the cathode-ray tube 113. The pedestal pulses on lead 103 are supplied through positions 2 and 3 of switch S-3A to the input of the intensity restorer. The restorer clamps the upper edges of these positive pedestal pulses to a fixed voltage level corresponding to normal intensity of the cathode-ray trace on the face of the cathode-ray tube, and the negative portion of these pedestal pulses, corresponding to the time intervals between sweeps, bias the control-grid of the cathode-ray tube so as to blank the cathode-ray beam.

Automatic frequency control circuits

The automatic frequency control circuits 116 are similar to those described and claimed in Patent 2,636,988 and are identical with those as shown and described in my aforesaid application S. N. 267,347, now Patent 2,697,219. The AFC circuits 116 include an AFC delay circuit, an AFC amplifier, and an AFC synchronizer. Negative trigger pulses derived from the leading edges of the negative A and B pedestal pulses on lead 105 initiate the AFC delay circuit. This circuit produces negative output pulses of approximately 100 microseconds duration, and these negative pulses are applied to a differentiating circuit at one input of the AFC synchronizer, and to the gain synchronizer 350 over lead 127.

The differentiating circuit at one input of the AFC synchronizer produces first and second positive output trigger or sampling pulses from the trailing edges of the negative 100 microsecond pulses. The first positive sampling pulses are delayed 100 microseconds from the leading edges of the negative A pedestal pulses on lead 105, and the second positive sampling pulses are delayed 100 microseconds from the leading edges of the negative B pedestal pulses on lead 105.

Received A and B pulses from receiver 12 are supplied over lead 23 to the AFC amplifier where they are further amplified and supplied to a differentiating circuit at another input of the AFC synchronizer. AFC switch S-4 coupled to the AFC amplifier places the AFC circuits 116 in operation. The output of the AFC amplifier is grounded by the "left-right" switch S-7 to disable the operation of the AFC during the "left" or "right" positions to allow for proper operations of the drift circuits.

The AFC synchronizer produces first and second recurrent output pulses of current. The amplitude of the first pulses varies according to the relative time position or coincidence between the applied differentiated A pulses and the applied first positive sampling pulses from the differentiating circuit at the input of the AFC synchronizer. The amplitude of the second pulses of current varies according to the relative time position or coincidence between the applied differentiated B pulses and the second positive sampling pulses from the differentiating circuit. These first and second output pulses of current are applied to the armature of a relay included within the automatic time difference measuring circuits 250. The relay is energized by the square-wave voltage from the relay driver 132 to separate the first output pulses of current from the AFC synchronizer from the second output pulses of current. The first output pulses, varying according to the relative time position of the differentiated A pulses with respect to the first positive sampling pulses, are applied to a long time constant filter included within the A. T. D. circuits 250 where they are integrated to produce the automatic frequency control voltage. This AFC voltage is amplified and supplied over lead 49 to the reactance tube 48 so as to maintain the frequency of the 100 kilocycle-per-second oscillator in the oscillator divider circuits 25 such that the first positive sampling pulses applied to the AFC synchronizer are coincident with the differentiated A pulses.

The magnitude of the control voltage on lead 49 is under the independent manual control of the drift potentiometer 125 and "left-right" switch S-7 coupled to the long time constant filter. The "left-right" switch S-7 provides two fixed negative control voltages of different magnitudes for biasing reactance tube 48, in addition to supplying feedback pulses to the third frequency divider through switch S-3F as explained heretofore in connection with the A delay circuits 55. In the "left" position of switch S-7, one of these negative control voltages causes the delineated pulses on the face of the cathode-ray tube 113 to drift slowly across the face of the tube to the left, while in the "right" position of switch S-7 the other negative control voltage causes a drift of the delineated loran pulses to the right. The drift potentiometer 125 provides an adjustable negative control voltage from the long time constant filter for slowly drifting the delineated A and B pulses either to the right or to the left. These manual controls facilitate the alignment of the received loran A and B pulses atop their respective A and B pedestals. The basic PRR switch S-8 coupled to the long time constant filter through potentiometer 125 provides three separate time constants for the filter corresponding to the three basic pulse repetition rates H, L, or S.

Automatic time difference measuring circuits

The A. T. D. measuring circuits 250 are identical to those shown and described in my aforesaid application S. N. 267,347, now Patent 2,697,219. These circuits include the aforementioned relay for separating the first output pulses of current from the AFC synchronizer from the second output pulses of current. These second output pulses varying according to the relative time position of the differentiated B pulses and the second positive sampling pulses are applied to a second long time constant filter where they are integrated to produce a direct control voltage. This direct control voltage is supplied through a cathode follower, an amplifier, and another cathode follower to lead 261. Similarly, the AFC voltage from the first long time constant filter is supplied through a cathode follower, an amplifier, and another cathode follower to lead 260. The amplified control voltage on lead 261 is coupled through the relay control circuit of the present invention to one terminal of servo motor 94 in the B delay circuits 60. The amplified control voltage on lead 260 is coupled through switch 259 to the other terminal of the servo motor 94. The difference between the control voltages on leads 260 and 261 energize the servo motor 94. The servo motor varies the time delay of the second positive sampling pulses from the B delay circuits to automatically synchronize or track these second positive sampling pulses with the received loran B pulses, as more full explained in my aforesaid application S. N. 267,347, now Patent 2,697,219.

*Automatic amplitude balancing circuits*

The automatic amplitude balancing circuits now to be described are identical to those described and claimed in application S. N. 403,771, now Patent No. 2,732,549, filed January 13, 1954, in the name of Wilbert P. Frantz, entitled "Automatic Amplitude Balance Control System for Hyperbolic Navigation Receivers," now Patent No. 2,732,549, issued January 24, 1956, and assigned to the same assignee as the present invention. Recurrent negative 100 microsecond pulses are supplied from the AFC circuits 116 over lead 127 to a differentiating circuit at one input of a gain synchronizer 350. The differentiating circuit produces first and second positive sampling pulses from the trailing edges of the recurrent negative 100 microsecond pulses in the same manner as described in connection with the AFC circuits 116. These first and second positive sampling pulses may be amplified before energizing the gain synchronizer 350. Negative loran A and B pulses are supplied from the AFC circuits 116 over lead 129 to a phase inverter 351. Positive loran A and B pulses from the output of the phase inverter 351 are supplied to another input of gain synchronizer 350. The gain synchronizer may be of the four-diode switch type as shown in Fig. 10.10 on page 374 of the book "Waveforms" published by the McGraw-Hill Book Company, 1949.

The gain synchronizer produces first recurrent output pulses of current whose amplitude varies according to the relative time position or coincidence between the first positive sampling pulses and the loran A pulses, and produces second recurrent output pulses of current whose amplitude varies according to the relative time position between the second positive sampling pulses and the loran B pulses. Since the first positive sampling pulses have been made to occur coincident with the cross-over of the differentiated A pulses by action of the AFC system, as taught in Patent 2,636,988, these particular positive sampling pulses occur at instants corresponding to the peak of the received loran A pulses. Accordingly, the output pulses of current from the gain synchronizer which result from the coincidence of the first positive sampling pulses and the A pulses vary according to the peak value of the A pulses.

In a similar manner, the second positive sampling pulses are brought into coincidence with the loran B pulses to produce output current pulses from the gain synchronizer which vary according to the peak value of the B pulses. Since the second positive sampling pulses are derived from the variably-delayed B pedestal pulses on lead 105, they are likewise variably-delayed pulses. In order to bring the second positive sampling pulses into coincidence with the received loran B pulses, the time position of these positive pulses is varied under the control of servo motor 94 or the fine delay knob 96 of the B delay circuits 60 in order to match the received loran A and B pulses on the face of the cathode-ray tube 113 as in the normal operating procedure. When the A and B pulses are properly matched on the face of the cathode-ray tube 113, the second positive sampling pulses are coincident with the peak value of the received loran B pulses.

The first and second recurrent output pulses from the gain syncronizer 350 are coupled to the armature or movable contact 130 of relay 131. The winding of relay 131 is energized by the square-wave voltage from the relay driver 132. The armature 130 of relay 131 vibrates in synchronism with the square-wave voltage to separate the first recurrent output pulses from the second recurrent output pulses. The first output pulses of current varying according to the amplitude of the A pulses are supplied to a condenser 352, and the second output pulses of current varying according to the amplitude of the received B pulses are supplied to a condenser 353. The condenser 352 is charged to a potential varying according to the value of the first current pulses, and the condenser 353 is charged to a potential varying according to the second current pulses. The armature 130 of relay 131 alternates between the charged potential on condenser 352 and the charged potential on condenser 353 at the frequency of the square-wave voltage supplied to the relay 131. This alternating voltage on armature 130 is the automatic amplitude balance control voltage, as is more fully explained in the aforesaid pending application S. N. 403,771, now Patent 2,732,549, and this AABC voltage is supplied through the AABC amplifier circuits 382 to the amplitude balance restorer in receiver 12.

Control box 135 includes an automatic balance control on-off switch 136, a manual gain control 137, and a manual amplitude balance control 138, as explained in the aforesaid Patent No. 2,651,033. When the switch 136 is in the off position, the control box supplies manually adjustable control voltages across each condenser 352 and 353. The manual gain control 137 raises and lowers the applied control voltages together, and the manual amplitude balance control 138 raises the voltage supplied to one condenser while lowering the voltage supplied to the other condenser.

*Automatic gain control circuits*

The automatic gain control circuits 356 now to be described are distinct from those described in the aforesaid Patent 2,651,033, and these circuits are more fully described and claimed in application S. N. 403,852, filed January 13, 1954, in the name of Wilbert P. Frantz, entitled "Automatic Gain Control System for Hyperbolic Navigation Receivers," now Patent No. 2,728,908, issued December 27, 1955, and assigned to the same assignee as the present invention.

The potential across condenser 352 is supplied over lead 357 to one input of the AGC circuits 356, and the potential across condenser 353 is supplied over lead 358 to a second input of the AGC circuits 356. The AGC circuits include a double-triode amplifier 359 for separately amplifying the two applied voltages. The separately amplified output voltage from the anodes 360 and 361 of amplifier tube 359 are coupled respectively to anodes 362 and 363 of a double-diode selector tube 364. The cathodes 365 and 366 of selector tube 364 are coupled together and are returned through series resistors 367 and 368 to a source of negative direct voltage. The AGC circuits 356 are responsive to the potentials across condensers 352 and 353 to produce a direct output control voltage which varies according to the strength of the smaller of the direct potentials across these condensers, as more fully explained in the aforesaid application S. N. 403,852, now Patent No. 2,728,908, filed January 13, 1954. The automatic gain control voltage at the junction of resistors 367 and 368 varying according to the smaller of the direct potentials across the condensers 352 and 353 is supplied to receiver 12 to control its gain.

*Automatic synchronization indicator and control circuit*

The automatic synchronization indicator and control circuit of the present invention include a double triode relay control tube 391 and a single triode "blink" amplifier 392 situated within box 393. A bias control voltage is supplied to the first control grid 394 of the double triode 391 from the AGC selector 364 through a voltage divider composed of resistors 395 and 396. A fixed negative voltage is supplied to the lower terminal of resistor 396. This bias control voltage on control grid 394 is identical in character to the AGC voltage supplied to receiver 12. The first anode 397 of double triode 391 is coupled through anode load resistor 398 to a fixed positive potential, and both cathodes are returned to ground. The second control grid 399 of double triode 391 is coupled through a series resistor 400 directly to one arm of the interference reducer switch S–14 of receiver 12. This arm is directly coupled to the output load resistor of the second detector 19, as shown in the aforesaid Patent 2,651,033. The detector output voltage is supplied through series resistor 400 to control grid 399.

Potentiometer 401 supplies an adjustable positive voltage through series resistor 402 to set the threshold bias level on control grid 399. Condenser 403 cooperates with resistor 400 to act as a low-pass filter having a cut-off frequency that is substantially lower than the lowest pulse repetition frequency to be used.

The second anode 404 of double triode 391 is coupled through anode load resistor 405 to a fixed positive potential. The winding of a double-pole, single throw relay 406 is coupled between anodes 397 and 404. The load resistor 405 is of substantially higher resistance than the load resistor 398 to limit the maximum current that can be drawn through it so that the relay 406 will not operate when the left-hand section of the control tube 391 is cut off and the right-hand section is conducting.

An indicator lamp 407 in series with a source of energy 408 is coupled across one pair of relay contacts. Lead 261 from the A. T. D. measuring circuits 250 is coupled through the second pair of relay contacts to one terminal of servomotor 94. When the relay 406 is energized, the circuits to the lamp 407 and the motor 94 are closed.

The "blink" amplifier tube 392 is provided with a load resistor 409, a cathode resistor 410, and a grid leak 411 connected as in an ordinary resistance-coupled amplifier. The control grid of the tube 392 is coupled through capacitors 412 and 413 respectively to the anodes 363 and 362 of the A. G. C. selector tube 364. The anode of the "blink" amplifier tube 392 is coupled through a series resistor 414 and a capacitor 415 to the grid 399 of the relay control tube 391. The coupling networks associated with the "blink" amplifier 392 are designed to pass the relatively low "blink" frequency, which is about one cycle per second.

In the normal operation of the loran system, both the A and B pulses are present. The A. G. C. system provides a negative voltage at the grid 394 of the relay control tube 391 sufficient to maintain the right-hand section cut-off. The output of the detector 19 in the receiver 12 consists of the alternate A and B pulses. These pulses are prevented by the low-pass filter 400, 403 from reaching the grid 399 of the control tube 391. Normally there is no output from the "blink" amplifier 392, so the potential at the grid 399 is determined by the setting of the potentiometer 401. This is adjusted to make the left-hand section of the relay control tube 391 conductive.

When the left-hand section of tube 391 is conducting, the voltage at the anode 404 falls to a relatively low value owing to the voltage drop in the load resistor 405. The voltage at the anode 397 will remain relatively high with the right-hand section cut off, as it is under normal operation of the loran system. Thus the relay 406 is energized, the indicator lamp 407 is lighted, and the motor 94 is operative.

If synchronism is lost with either or both of the A and B pulses as a result of a transmitter failure, for example, the A. G. C. system will operate to increase the gain of the receiver to its maximum value during one or both parts of the square-wave switching cycle. This raises the ambient noise level at the input of the detector 19. The detector 19 rectifies the noise signal, providing a negative D.-C. voltage that passes through the filter 400, 403 and cuts off the left-hand section of the relay control tube 391. At the same time, since the AGC system is calling for maximum gain, the right-hand section of the tube 391 will be made conductive. Under these conditions, the voltage at the anode 404 will tend to rise, while that at the anode 397 will fall. However, since load resistor 405 is high enough to limit the current, as mentioned above, the relay 406 will not be energized sufficiently to remain closed. Accordingly, the lamp 407 goes out and the servomotor 94 is disconnected.

There are some types of failure that could occur in which the AGC would call for maximum gain, but the ambient noise would not increase enough to cut off the left-hand section of the relay control tube; for example, one of the high frequency stages of the receiver 12 might become inoperative. In such a case, both sections of the control tube 391 would be conductive. Under this condition, the voltages at both anodes 397 and 404 drop to relatively low values, and the relay is deenergized. Again the lamp 407 goes out, and the motor 94 is disconnected.

Finally, there is another basic situation where the invention operates to produce a warning indication and that is where the A and B pulses are received in the presence of strong radio interference or atmospheric noise signals. In such a case the AGC system provides a negative voltage at the grid 394 of the relay control tube 391 sufficient to cut off the right hand section thereof. The negative D.-C. voltage at the output of detector 19, corresponding to the rectified interfering signals, is sufficient to cut off the left hand section of control tube 391. With both sections of the control tube 391 non-conductive, the respective anodes thereof assume a relatively high positive potential precluding operation of relay 406 which responds differentially to said anode potentials. Once again the lamp 407 goes out and the motor 94 is disconnected.

Thus, the operation of relay 406 is controlled by the negtive AGC and noise voltage amplitudes according to the following summary:

| AGC Voltage (negative) | Noise Voltage (negative) | Relay Status |
| --- | --- | --- |
| High | Low | Energized. |
| Low | High | Deenergized. |
| Low | Low | Deenergized. |
| High | High | Deenergized. |

When both the master and slave transmitters are operating, but not in the precise required time relationship, it is desirable to provide a signal to indicate that the intervals as measured at the receiver station are not to be relied upon. This is done by periodically shifting the phase of the master and slave transmissions back and forth by a discrete amount, say 1000 microseconds, at intervals of about one second. This type of transmission is referred to as "blinking."

If the receiver system is operating normally, synchronism with the received pulses will be lost and regained periodically at one second intervals. The AGC system will operate correspondingly to periodically call for maximum receiver gain. However, the filter 400, 403 may prevent the corresponding variations in rectified ambient noise from operating the relay tube 391. The "blink" amplifier 392 is designed to pass the one cycle variations in AGC voltage as an A.-C. signal which is applied to the grid 399 of the relay control tube 391.

Under "blinking" conditions, the left-hand side of the tube 391 is alternately cut off and conductive, while the right-hand side is respectively conductive and cut off. This deenergizes and energizes the relay cyclically at the "blink" frequency, making the indicator lamp 407 blink accordingly, to show that the measured time delay interval is incorrect, but that the system is otherwise operative.

While a preferred structural embodiment of the automatic synchronization indicator and control circuit has been described in detail, it should be noted that the present invention does not depend upon the specific use of the dual triode comprising relay control tube 391. The principle of operation of the present invention may be carried out by the use of alternative relay control techniques well known in the art or, for example, by use of a polarized relay whereby the relay would be rendered operative solely in the simultaneous presence of high AGC and low noise voltages denoting the reception, respectively, of strong A and B pulses and low-level noise signals.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A hyperbolic navigation receiver responsive to recurrent A pulses transmitted from a master station and to recurrent B pulses transmitted from a slave station, oscillator means coupled to the output of said receiver and adapted to be synchronized to said received A pulses, variable delay means coupled to the output of said oscillator means for producing delayed output pulses adapted to be synchronized to said received B pulses, first responsive means jointly coupled to the output of said receiver and said oscillator means for producing a first output control voltage upon the coincidence of said received A pulses and said oscillator output voltage, second responsive means jointly coupled to the output of said receiver and said variable delay means for producing a second output control voltage upon the coincidence of said received B pulses and the output pulses from said variable delay means, and means coupled to the output of said first and second responsive means and responsive to said first and second output control voltages for indicating the absence of one of said control voltages.

2. A radio navigation receiver responsive to recurrent A pulses transmitted from a master station and to recurrent B pulses transmitted from a slave station, each of said recurrent B pulses arriving at the receiver at a time delayed from the arrival of each of corresponding recurrent A pulses, oscillator means coupled to the output of said receiver and adapted to be synchronized to said received A pulses, variable delay means coupled to the output of said oscillator means for producing delayed output pulses adapted to be synchronized to said received B pulses, first responsive means jointly coupled to the output of said receiver and said oscillator means for producing a first output control voltage upon the coincidence of said received A pulses and said oscillator output voltage, second responsive means jointly coupled to the output of said receiver and said variable delay means for producing a second output control voltage upon the coincidence of said received B pulses and the output pulses from said variable delay means, and threshold responsive means jointly coupled to the output of said receiver and said first and second responsive means and being jointly responsive to the average receiver output and said first and second control voltages for indicating the absence of one of said control voltages.

3. In a hyperbolic navigation receiver receptive to periodic master pulses and to periodic slave pulses from distant transmitters wherein the pulses from said transmitters may be recurrently displaced in time from their normal pulse recurrence interval to denote improper transmitter operation: means for indicating at said receiver the improper transmitter operation, comprising oscillator means coupled to the output of said receiver and adapted to be synchronized to said received periodic master pulses, variable delay means coupled to the output of said oscillator means for producing delayed output pulses adapted to be synchronized to said received slave pulses, first responsive means jointly coupled to the output of said receiver and said oscillator means for producing a first output control voltage upon the coincidence of said received periodic master pulses and said oscillator output voltage, said first output control voltage varying in magnitude according to the recurrent displacement in time of said master pulses, second responsive means jointly coupled to the output of said receiver and said variable delay means for producing a second output control voltage upon the coincidence of said received periodic slave pulses and said delayed output pulses from said variable delay means, said second output control voltage varying in magnitude according to the recurrent displacement in time of said slave pulses, and means coupled to the output of said first and second responsive means and being responsive to said first and second control voltages for indicating the recurrent variation in the magnitudes of either of said first or second control voltages.

4. A hyperbolic navigation receiver responsive to recurrent A pulses transmitted from a master station and to recurrent B pulses transmitted from a slave station, oscillator means coupled to the output of said receiver and adapted to be synchronized to said received A pulses, variable delay means coupled to the output of said oscillator means for producing delayed output pulses adapted to be synchronized to said received B pulses, control means coupled to said variable delay means for varying the delay of said delayed output pulses to automatically maintain synchronization with said received B pulses, first responsive means jointly coupled to the output of said receiver and said oscillator means for producing a first output control voltage upon the coincidence of said received A pulses and said oscillator output voltage, second responsive means jointly coupled to the output of said receiver and said variable delay means for producing a second output control voltage upon the coincidence of said received B pulses and said delayed output pulses from said variable delay means, and means intercoupled between the output of said first and second responsive means and said variable delay control means for disabling said control means to prevent variations in the delay of said output pulses from said variable delay means in the absence of one of said first and second control voltages.

5. In a radio navigation receiver alternately responsive to first recurrent pulses received during first time intervals and to second recurrent pulses received during second time intervals, said receiver including an oscillator means coupled to the output thereof and adapted to be synchronized to said received first recurrent pulses, and further including a variable delay means coupled to the output of said oscillator means for producing delayed output pulses adapted to be synchronized to said received second recurrent pulses: a synchronization indicator comprising first responsive means coupled to the output of said receiver and said oscillator means and being responsive to the coincidence of said received first recurrent pulses and said oscillator output voltage for producing a first output control voltage, second responsive means coupled to the output of said receiver and said variable delay means and being responsive to the coincidence of said received second recurrent pulses and said delayed output pulses from said variable delay means for producing a second output control voltage, and means coupled to the output of said first and second responsive means and being actuated by said first and second control voltages to indicate the presence of both of said control voltages.

6. In a radio navigation receiver alternately responsive to first recurrent pulses received during first time intervals and to second recurrent pulses received during second time intervals, said receiver including pulse oscillator means producing first output pulses adapted to be automatically synchronized to said received first recurrent pulses, and further including variable delay means coupled to said pulse oscillator means and producing delayed second output pulses adapted to be automatically synchronized to said received second recurrent pulses: means providing an indication of the existence of synchronization between said pulse oscillator means and said received first recurrent pulses and between said variable delay means and said received second recurrent pulses, comprising means coupled to the output of said receiver for selectively responding to the output therefrom during the occurrence of said first output pulses from said pulse oscillator means and during the occurrence of said second output pulses from said variable delay means, and means coupled to the output of said selective responsive means for indicating the presence of an output therefrom during the occurrence of both said first and second output pulses from said pulse oscillator means and said variable delay means.

7. In a radio navigation receiver responsive to recurrent pulses transmitted from a distant station and including pulsed oscillator means adapted to be automatically synchronized with said received recurrent pulses, said navigation receiver including an automatic gain control system responsive to said received pulses for regulating the gain of said receiver: means for indicating the existence of synchronization between said pulsed oscillator means and said received recurrent pulses, comprising selective responsive means jointly coupled to the output of said receiver and to said pulsed oscillator means for producing an output control voltage upon the coincidence of said received recurrent pulses and the output pulses from said pulsed oscillator means, and means jointly coupled to said selective responsive means and to the output of said receiver and responsive to the difference between said control voltage and the average output from said receiver for indicating the existence of synchronization.

8. In a radio navigation receiver alternately responsive to first recurrent pulses received during first time intervals and to second recurrent pulses received during second time intervals, said receiver including an oscillator means coupled to the output thereof and adapted to be synchronized to said received first recurrent pulses, and further including a variable delay means coupled to the output of said oscillator means for producing delayed output pulses adapted to be synchronized to said received second recurrent pulses: a synchronization indicator comprising responsive means coupled to the output of said receiver, to the output of said oscillator means, and to the output of said variable delay means, said responsive means being jointly responsive to the coincidence of said received first recurrent pulses and said oscillator output voltage during said first time intervals for producing a first output control voltage and being further jointly responsive to the coincidence of said received second recurrent pulses and said delayed output pulses from said variable delay means during said second time intervals for producing a second output control voltage, and means coupled to the output of said responsive means and being actuated by said first and second control voltage to indicate the existence of synchronization of said navigation receiver with said first and second received recurrent pulses.

9. A hyperbolic navigation receiver receptive to recurrent master pulses and recurrent slaved pulses wherein each of said recurrent slave pulses arrive at the receiver at a time delayed from the arrival of each of corresponding recurrent master pulses, comprising in combination, oscillator means coupled to the output of said receiver and adapted to be synchronized to said received recurrent master pulses, variable delay means coupled to the output of said oscillator means for producing delayed output pulses adapted to be synchronized to said received recurrent slave pulses, means coupled to said variable delay means for varying the time delay of said delayed output pulses to maintain synchronization between said delayed output pulses and said received recurrent slave pulses, first responsive means jointly coupled to the output of said receiver and said oscillator means for producing a first output control voltage upon the coincidence of said received recurrent master pulses and said oscillator output voltage, second responsive means jointly coupled to the output of said receiver and said variable delay means for producing a second output control voltage upon the coincidence of said received recurrent slave pulses and said delayed output pulses from said variable delay means, and means intercoupling the output of said first and second responsive means to said means coupled to said variable delay means and being responsive to said first and second control voltages for preventing any change in the time delay of said output pulses from said variable delay means in the absence of one of said first and second control voltages.

10. In an apparatus for measuring the time difference interval between reference and delayed recurrent pulses including a first servo control system having a reference timing oscillator means producing first output pulses adapted to be synchronized with said reference pulses and including a second servo control system having a variable delay pulse generator means coupled to said reference timing oscillator and producing delayed second output pulses adapted to be synchronized with said reference pulses, the combination comprising a first pulse coincidence means receiving said reference recurrent pulses and said first output pulses, said first pulse coincidence means producing a first output control voltage upon the coincidence of said reference pulses and said first output pulses, a second pulse coincidence means receiving said delayed recurrent pulses and said delayed second output pulses, said second pulse coincidence means producing a second output control voltage upon the coincidence of said delayed pulses and said second output pulses, means coupled to said first and second pulse coincidence means for indicating the absence of one of said first or second output control voltages, said means being coupled to said second servo control system for rendering said second servo control system inoperative upon the absence of one of said output control voltages.

11. In an automatic tracking loran receiver responsive to recurrent A pulses transmitted from a master station and to recurrent B pulses transmitted from a slave station, said receiver measuring the time difference interval between said received recurrent A and B pulses, the combination comprising a first servo control system including a reference timing oscillator means producing first recurrent output pulses and a first pulse coincidence means jointly responsive to said first recurrent pulses and said received A pulses, said first pulse coincidence means being coupled to said oscillator means for maintaining said first recurrent pulses synchronized with said received A pulses, a second servo control system including a variable delay pulse generator means coupled to said reference timing oscillator means for producing delayed second recurrent output pulses and a second pulse coincidence means jointly responsive to said second recurrent pulses and said received B pulses, said second pulse coincidence means being coupled to said variable delay pulse generator for maintaining said second recurrent pulses synchronized with said received B pulses, first responsive means jointly coupled to the output of said receiver and to said oscillator means for producing a first output control voltage upon the coincidence of said received A pulses and said first recurrent pulses, second responsive means jointly coupled to the output of said receiver and to said variable delay pulse generator for producing a second output control voltage upon the coincidence of said received B pulses and said second recurrent pulses, indicator means coupled to the outputs of said first and second responsive means for indicating the absence of one or both of said first or second output control voltages, and means coupling said indicator means to said second servo control system for disabling said second servo control system upon the absence of one or both of said first or second output control voltages.

12. Apparatus as defined in claim 1 wherein said means for indicating the absence of one of said control voltages includes means for selecting the smaller of said first and second output control voltages, and means for indicating the absence of said selected voltage.

13. In a radio navigation receiver, apparatus for producing a warning signal for informing the receiver operator of the condition when the navigational information supplied by the receiver should not be relied upon, said apparatus comprising means adapted to receive signals including recurrent A pulses transmitted from a master station and recurrent B pulses transmitted from a slave station and operative to produce first and second control signals, said first control signal being related to the average strength of said signals as received and said second control signal being related to the strength of at least one of said received A and B pulses, and means adapted to receive said first and second control signals and operative to produce said warning signal solely upon the concurrence of a relatively low value of said first control signal and a relatively high value of said second control signal.

14. A hyperbolic navigation receiver responsive to signals including recurrent A pulses transmitted from a master station, and to recurrent B pulses transmitted from a slave station, oscillator means coupled to the output of said receiver and adapted to be synchronized to said received A pulses, variable delay means coupled to the output of said oscillator means for producing delay output pulses adapted to be synchronized to said received B pulses, first responsive means jointly coupled to the output of said receiver and said oscillator means for producing a first output control voltage upon the coincidence of said received A pulses and said oscillator output voltage, second responsive means jointly coupled to the output of said receiver and said variable delay means for producing a second output control voltage upon the coincidence of said received B pulses and the output pulses from said variable delay means, means coupled to the output of said receiver for producing a third output control voltage related to the average strength of said received signals, means for selecting the smaller of said first and second output control voltages, and warning signal generating means adapted to receive said third output control voltage and the selected one of said first and second output voltages to produce said warning signal upon the concurrence of a relatively high value of said selected output control voltage and a relatively low value of said third output control voltage.

References Cited in the file of this patent

UNITED STATES PATENTS

| | | |
|---|---|---|
| 2,612,601 | Musselman | Sept. 30, 1952 |
| 2,651,033 | Frantz | Sept. 1, 1953 |